(12) United States Patent
Chen

(10) Patent No.: US 10,540,208 B2
(45) Date of Patent: Jan. 21, 2020

(54) ALLOCATING COMPUTING RESOURCES TO A CONTAINER IN A COMPUTING ENVIRONMENT

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 203 days.

(21) Appl. No.: 15/852,079

(22) Filed: Dec. 22, 2017

(65) Prior Publication Data

US 2019/0196876 A1 Jun. 27, 2019

(51) Int. Cl.
*G06F 9/50* (2006.01)

(52) U.S. Cl.
CPC .................................. *G06F 9/5038* (2013.01)

(58) Field of Classification Search
None
See application file for complete search history.

(56) References Cited

U.S. PATENT DOCUMENTS

| | | | |
|---|---|---|---|
| 8,433,801 B1 | 4/2013 | Yemini et al. | |
| 9,081,627 B1 | 7/2015 | Blanding et al. | |
| 9,621,643 B1 | 4/2017 | Emelyanov | |
| 2018/0173567 A1* | 6/2018 | Olshefski | G06F 9/5011 |

FOREIGN PATENT DOCUMENTS

CN   106874102 A   6/2017

OTHER PUBLICATIONS

Liu, X., et al., "Wireless Resource Scheduling Based on Backoff for Multiuser Multiservice Mobile Cloud Computing," IEEE Transactions on Vehicular Technology, 2015, http://ieeexplore.ieee.org/document/7410063/.
Sharma, R.K., et al., "A Latency Reduction Mechanism for Virtual Machine Resource Allocation in Delay Sensitive Cloud Service," IEEE, 2015 International Conference on Green Computing and Internet of Things, 371-375, http://ieeexplore.ieee.org/document/7380491/.
"Implementing Retries with Exponential Backoff," May 26, 2017, https://docs.microsoft.com/en-us/dotnet/standard/microservices-architecture/implement-resilient-applications/implement-retries-exponential-backoff.
Higashino, W.A., et al., "CEPaaS: Complex Event Processing as a Service," IEEE 6th International on Big Data, 2017, 169-176, http://ieeexplore.ieee.org/document/8029323/.

* cited by examiner

*Primary Examiner* — Sisley N Kim
(74) *Attorney, Agent, or Firm* — Kilpatrick Townsend & Stockton LLP

(57) ABSTRACT

Computing resources can be allocated to a container in a computing environment. For example, a computing device can determine that a dependent computing resource is to be allocated to the container. The dependent computing resource can depend on another computing resource being allocated to the container before the dependent computing resource is allocated to the container. The computing device can determine a parameter value for a backoff process for checking the availability of the dependent computing resource. The parameter value can be determined using another parameter value for another backoff process for checking the availability of the other computing resource. The computing device can then determine that the dependent computing resource is available by executing the backoff process using the parameter value. In response to determining that the dependent computing resource is available, the computing device can allocate the dependent computing resource to the container.

20 Claims, 3 Drawing Sheets

ALLOCATING COMPUTING RESOURCES TO A CONTAINER IN A COMPUTING ENVIRONMENT

TECHNICAL FIELD

The present disclosure relates generally to allocating computer resources. More specifically, but not by way of limitation, this disclosure relates to allocating computer resources to a container in a computing environment.

BACKGROUND

A computing device may attempt to allocate computing resources to a container (e.g., an isolated virtual environment) to deploy the container. Examples of the computing resources can include memory, processing power, and network resources. But some or all of the computing resources may not be immediately available for allocation to the container. For example, a computing resource may already be in use, may depend on another computing resource being allocated to the container first, or may otherwise be unavailable for allocation. If a computing resource cannot be immediately allocated to the container, the computing device may implement a backoff process to repeatedly check if the computing resource is available (e.g., is capable of being allocated to the container). For example, the computing device can wait for an initial time-duration, and then check again to see if the computing resource is available. If not, the computing device can repeatedly check at exponentially increasing time intervals to see if the computing resource is available. For example, with each failed attempt, the computing device can double the time interval until the next check. This process can continue until the computing resource becomes available or a maximum time-duration is reached. The initial time-duration, the time interval between checks, and the maximum time-duration can be referred to as backoff parameters.

Often, there are several computing resources that are not immediately available for allocation to the container. So, the computing device can execute the backoff process independently for each computing resource. And the backoff-parameter values for one computing resource will be independent of the backoff-parameter values for another computing resource.

DETAILED DESCRIPTION

Figure 1:
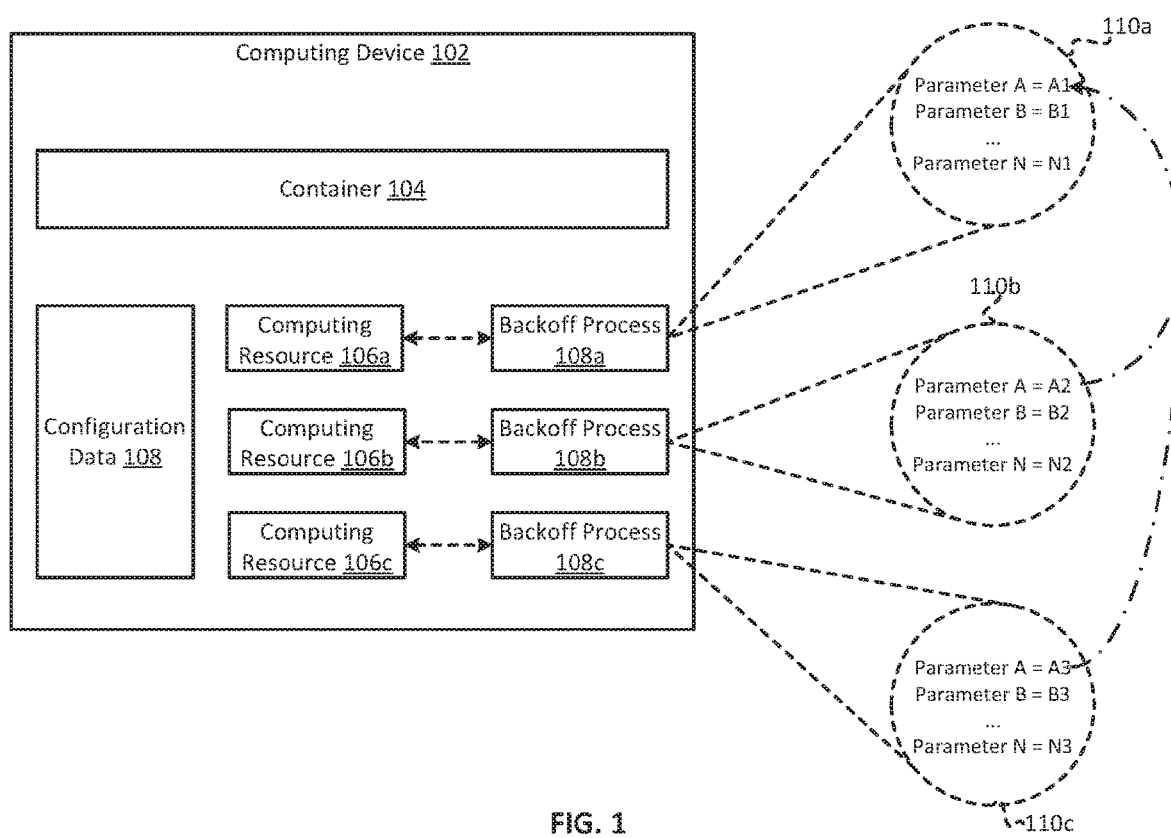
FIG. 1 is a block diagram of an example of a computing device for allocating computing resources to a container according to some aspects.

There can be disadvantages to a computing device determining backoff-parameter values for one backoff process independently of other backoff-parameter values for another backoff process. For example, this can ignore the interdependency between the computing resources for which the backoff processes are being performed, which can increase the overall amount of time (e.g., the latency) for all of the computing resources to be allocated to a container. More specifically, at least one of the computing resources can be a dependent computing resource. A dependent computing resource can require at least one other computing resource (e.g., another dependent or independent computing resource) to be allocated to the container prior to the dependent computing resource being allocated to the container. But if this dependency is ignored, the computing device will repeatedly check the availability of the dependent computing resource, even while the computing resource is waiting for the other computing resource(s) to be allocated, only to find that the dependent computing resource is not yet available. And with each failed attempt, the time interval until the next check will double in size, until the time interval has exponentially grown to a very large value. This can dramatically increase the amount of time it takes for the dependent computing resource to ultimately be allocated to a container, thereby increasing the overall startup latency of the container.

Some examples of the present disclosure overcome one or more of the abovementioned issues by determining a back-off-parameter value for a dependent computing resource based on another back-off parameter value for another computing resource (e.g., on which the dependent computing resource depends). This can help prevent, for example, the time-interval value for the backoff process from exponentially increasing to a very large value, thereby reducing the overall startup latency for the container.

As a particular example, part of deploying a container may involve allocating a statefulset to the container. A statefulset can be a workload application programming interface (API) object for managing stateful applications. The statefulset can be a dependent computing resource, which may require one or more other computing resources to be allocated to the container prior to allocating the statefulset to the container. For example, the statefulset may require a persistent volume and a network service port to be allocated to the container prior to allocating the statefulset to the container. But the persistent volume and the network service port may be unavailable for immediate allocation. So, the computing device can execute a backoff process for the persistent volume having an initial-delay value of 1 second (s), a time-interval value of 100 milliseconds (ms), and a maximum-duration value of 30 s. The computing device can also execute a separate backoff process for the network service port having an initial-delay value of 2 s, a time-interval value of 500 ms, and a maximum-duration value of 30 s.

After determining the backoff-parameter values for the persistent volume and the network service port, the computing device can then use them to determine one or more backoff-parameter values for a backoff process for the statefulset. For example, the computing device can determine that the initial-delay value for the statefulset's backoff process is a sum of the initial-delay values for the persistent volume and the network service port (e.g., 1 s+2 s=3 s). This can help ensure that both of these initial delays have lapsed (e.g., and an attempt has been made to allocate those resources) prior to the initial delay for the statefulset's backoff process lapsing. As another example, the computing device can determine that the time-interval value for the statefulset's backoff process is a maximum (e.g., 500 ms) of the time-interval values for the persistent volume and the network service port. This can help ensure that both these time intervals have lapsed (e.g., and another attempt has been made to allocate those resources) prior to the statefulset's time-interval lapsing. As another example, the computing device can determine that the maximum-duration value for the statefulset's backoff process is a sum of the maximum-duration values for the persistent volume and the network service port (e.g., 30 s+30 s=60 s). This can help ensure that the maximum number of allowed allocation-attempts have been made for the persistent volume and the network service port prior to the statefulset's maximum duration lapsing. In some examples, configuring the statefulset's backoff parameters based on the backoff parameters for the persistent volume and the network service port can reduce the number of failed attempts to allocate the statefulset to the container. This can prevent the time-interval value for the statefulset from exponentially increasing to a very large value, and thereby reduce the overall startup latency for the container.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a computing device 102 for allocating computing resources 106a-c to a container 104 according to some aspects. The computing device 102 can include a laptop computer, a desktop computer, a server, a mobile device, a node in a cloud computing environment or cluster, or any combination of these.

The computing device 102 can allocate (or attempt to allocate) one or more computing resources, such as computing resources 106a-c, to the container 104. In this example, computing resources 106a-c are shown as being part of the computing device 102, but in other examples, some or all of the computing resources 106a-c can be supplied by one or more remote computing devices, such as by other nodes in a cloud computing environment.

The computing resources can include any number and combination of dependent computing resources. Examples of dependent computing resources can include a statefulset and a pod. A pod can be a group of containers with shared storage, network components, and specifications. The computing resources can additionally or alternatively include any number and combination of independent computing resources. Independent computing resources can be computing resources that do not require any other computing resources to be allocated to the container 104 prior to the independent computing resource being allocated to the container 104. Examples of independent computing resources can include processing power, memory, a network interface component, a service port, a persistent volume, a persistent-volume attachment, or any combination of these.

The computing device 102 can access configuration data 108 to determine one or more relationships between the computing resources 106a-c (e.g., to determine if any of the computing resources 106a-c are dependent computing resources). In some examples, the configuration data 108 can be stored locally in a local memory of the computing device 102. In other examples, the configuration data 108 can be stored remotely and accessed via a network, such as the Internet. The configuration data 108 can be in the form of a lookup table or database indicating the one or more relationships between the computing resources 106a-c. The computing device 102 can access the configuration data 108 and determine, for example, that the computing resource 106a depends on computing resources 106b-c.

The computing device 102 can implement backoff processes for some or all of the computing resources 106a-c.

For example, the computing device 102 can determine that computing resources 106a-c are unavailable for allocation to the container 104. So, the computing device 102 can implement backoff processes for the computing resources 106a-c. If the computing resource 106a depends on computing resources 106b-c, the computing device 102 can begin by determining parameter values 110b-c for the backoff processes 108b-c. In this example, the parameter values 110b-c for Parameters A-N shown in the dashed circles in FIG. 1. Examples of the Parameters A-N can include can include the initial time-duration, the time interval between checks, the maximum time-duration, or any combination of these. The computing device 102 can then use these parameter values 110b-c to determine parameter values 110a for the backoff process 108a associated with the computing resource 106a. This is indicated by the dashed arrow. For example, the value of Parameter A (e.g., A1) in the backoff process 108a can be determined by taking the sum, average, median, mode, or maximum of A2 and A3. Additionally or alternatively, the value of Parameter B (e.g., B1) in the backoff process 108a can be determined by taking the sum, average, median, mode, or maximum of B2 and B3. Additionally or alternatively, the value of Parameter N (e.g., N1) in the backoff process 108a can be determined by taking the sum, average, median, mode, or maximum (e.g., larger) of N2 and N3. The computing device 102 can determine any number and combination of parameter values 110a for the backoff process 108a using any number and combination of parameter values for other backoff processes associated with any number and combination of other computing resources.

After determining the parameter values 110a-c for the backoff processes 108a-c, the computing device 102 can execute the backoff processes 108a-c using their respective parameter values 110a-c. While executing the backoff process 108a, in some examples, the computing device 102 can update some or all of the parameter values 110a based on (i) the parameter values 110b-c corresponding to the other backoff processes 108b-c, (ii) the availability of the other computing resources 106b-c, or (ii) both. For example, for each iteration of the backoff process 108a (e.g., each failed attempt to allocate the computing resource 106a), the computing device 102 can adjust one or more parameter values 110a for the backoff process 108a based on the availability of the other computing resources 106b-c.

As a particular example, the computing resource 106a can be a statefulset to be allocated to the container 104. The statefulset can depend on a persistent volume having backoff-parameter values designated as [initial_delay_PV, time_interval_PV, max_duration_PV]. The statefulset can also depend on a persistent volume attachment having backoff-parameter values designated as [initial_delay_PVA, time_interval_PVA, max_duration_PVA]. The statefulset can further depend on a network service port having backoff-parameter values designated as [initial_delay_SVP, time_interval_SVP, max_duration_SVP]. Since the persistent volume, persistent volume attachment, and network service port may be initially available, the initial parameter values for the statefulset can be [max(initial_delay_PV, initial_delay_PVA, initial_delay_SVP), max(time_interval_PV, time_interval_PVA, time_interval_SVP), max(max_duration_PV, max_duration_PVA, max_duration_SPV)], where max(X, Y, Z) indicates the maximum value of X, Y, and Z. After each time the computing device 102 checks for the availability of the statefulset, the parameter values for the backoff process 108a can be updated based on the availability of the persistent volume, persistent volume attachment, and network service port. For example, if the persistent volume becomes available, the next time-interval for the backoff process 108a can be set as max(max_duration_PVA, max_duration_SPV). This process can repeat until the persistent volume attachment and network service port also become available.

While executing the backoff processes 108a-c, some or all of the computing resources 108a-c may eventually become available. If this happens, the computing device 102 can allocate the computing resources 106a-c to the container 104 and deploy the container 104.

Although some examples of the present disclosure involve allocating computer resources to a container, in other examples, the computing resource can be allocated to another software component. For example, the computing device 102 may attempt to allocate computing resources 106a-c to another software component, but the computing resources 106a-c may not be immediately available. So, the computing device 102 can implement the backoff processes 108a-c for the computing resources 106a-c using similar methods as discussed above.

Figure 2:
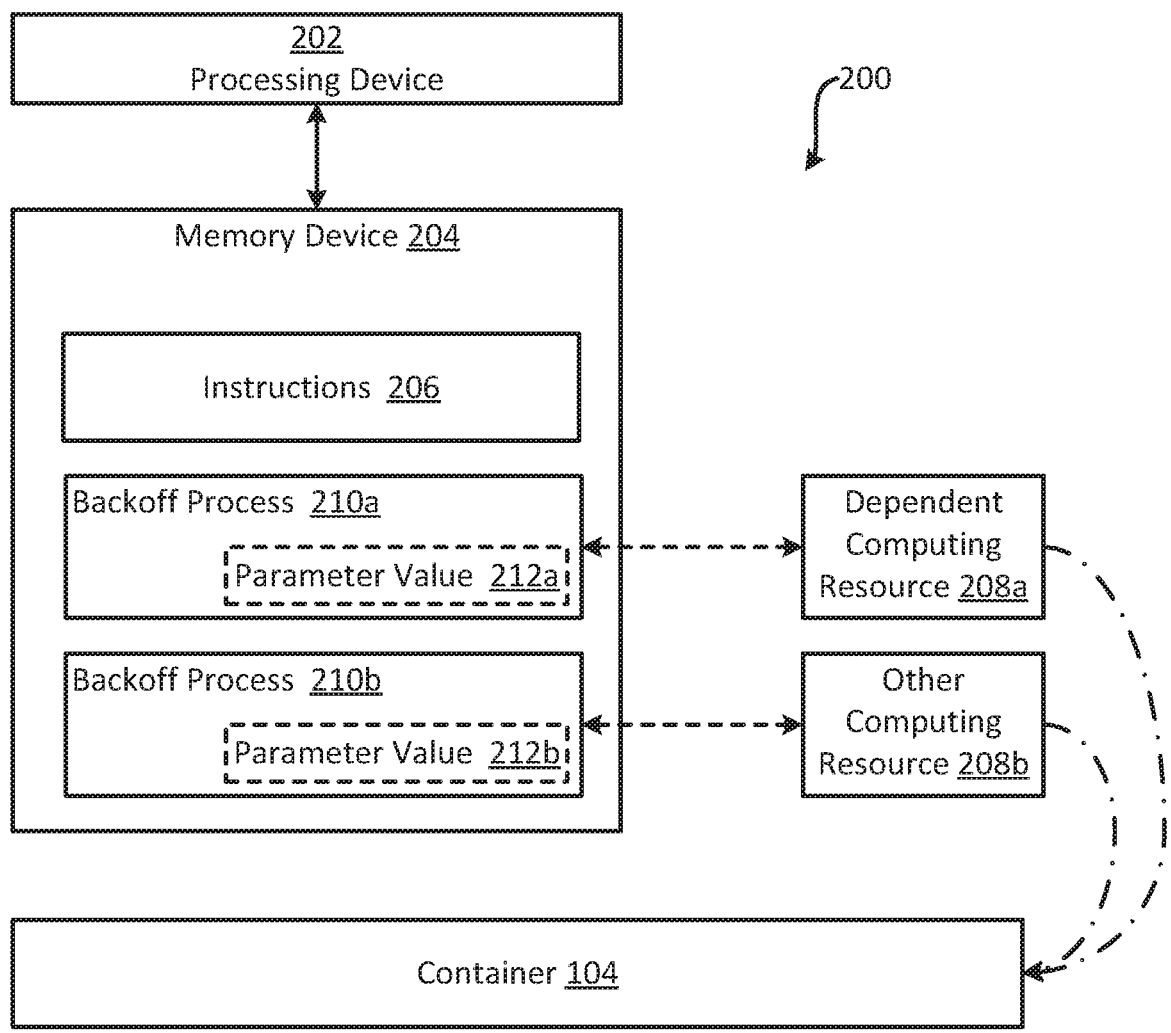
FIG. 2 is a block diagram of an example of a system for allocating computing resources to a container in a computing environment according to some aspects.

FIG. 2 is a block diagram of an example of a system 200 for allocating computing resources 208a-b to a container 104 in a computing environment according to some aspects. In this example, the system 200 includes a processing device 202 communicatively coupled to a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute one or more operations for allocating computing resources. The processing device 202 can execute instructions 206 stored in the memory device 204 to perform the operations. In some examples, the instructions 206 can include processor-specific instructions generated by a compiler or an interpreter from code written in any suitable computer-programming language, such as C, C++, C#, etc.

Memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions 206.

The memory device 204 can include instructions for a backoff process 210a corresponding to a dependent computing resource 208a. The memory device 204 can also have instructions for another backoff process 210b for another computing resource 208b on which the dependent computing resource 208a depends. The processing device 202 can execute the instructions to implement the backoff processes 210a-b.

In some examples, the processing device 202 can determine a parameter value 212a for the backoff process 210a based on another parameter value 212b for the other backoff process 210b. Examples of the parameter value 212a can include at least one of (i) an initial-delay value indicating an initial time delay for which to wait before checking the availability of the dependent computing resource 208a, (ii) a time-interval value indicating an amount of time to wait between a prior check and a next check of the availability of the dependent computing resource 208a, or (iii) a maximum-duration value indicating a maximum time duration for which to check for the availability of the dependent computing resource 208a. The processing device 202 can determine the parameter value 212a by, for example, adding a constant to the other parameter value 212b. In some examples, the constant can be yet another parameter value for yet another backoff process for yet another computing resource.

Although the other computing resource 208b is shown as a single box in FIG. 2 for simplicity, the other computing resource 208b can represent any number and combination of other computing resources on which the dependent computing resource 208a depends. Similarly, although the other backoff process 210b is shown as a single box in FIG. 2 for simplicity, the backoff process 210b can represent any number and combination of backoff processes corresponding to the computing resources on which the dependent computing resource 208a depends.

For example, the other computing resource 208b can include a first computing resource and a second computing resource. And the backoff process 210b can include a first backoff-process and a second backoff-process for the first computing resource and the second computing resource, respectively. In some examples, the processing device 202 can determine the parameter value 212a for the backoff process 210a using (i) a first parameter-value for the first backoff-process corresponding to the first computing resource, and (ii) a second parameter-value for the second backoff-process corresponding to the second computing resource. As a particular example, the processing device 202 can determine that the parameter value 212a is the sum, average, or larger of the first parameter-value and the second parameter-value.

After determining the parameter value 212a for the backoff process 210a, the processing device 202 can execute the backoff process 210a. The processing device 202 may eventually determine, using the backoff process 210a, that the dependent computing resource 208a is available. Once available, the processing device 202 can allocate the dependent computing resource 208a to the container 104, as indicated by the dashed line from the dependent computing resource 208a to the container 104. In some examples, prior to allocating the dependent computing resource 208a to the container 104, the processing device 202 may also execute the backoff process 210b for the other computing resource 208b, determine that the other computing resource 208b is available, and allocate the other computing resource 208b to the container 104. This is indicated by the dashed line from the other computing resource 208b to the container 104.

Figure 3:
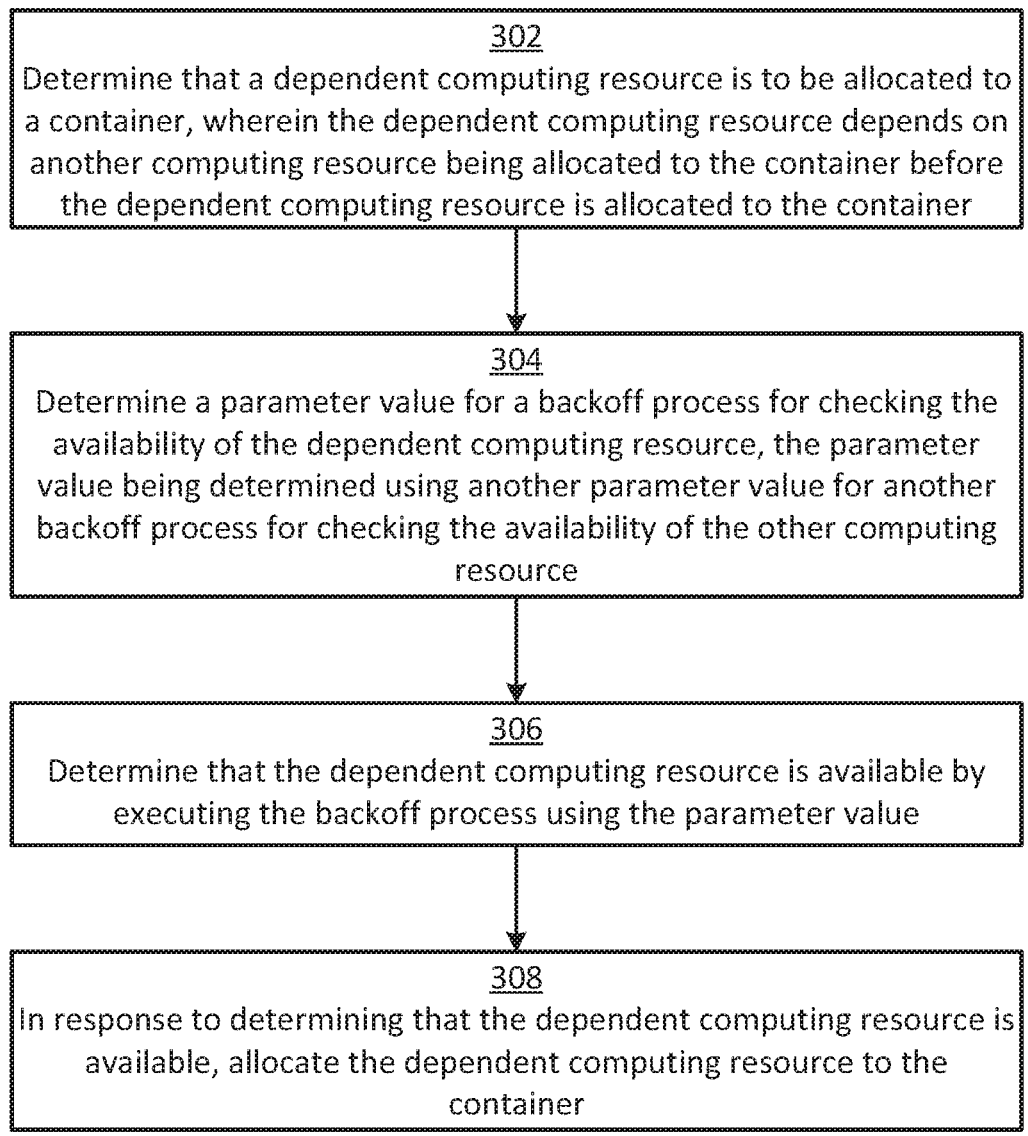
FIG. 3 is a flow chart of an example of a process for allocating computing resources to a container in a computing environment according to some aspects.

In some examples, the processing device 202 can perform one or more of the steps shown in FIG. 3 to allocate computing resources. In other examples, the processing device 202 can implement more steps, fewer steps, different steps, or a different order of the steps depicted in FIG. 3. The steps of FIG. 3 are described below with reference to components discussed above.

In block 302, the processing device 202 determines that a dependent computing resource 208a is to be allocated to a container 104. The dependent computing resource 208a can depend on another computing resource 208b being allocated to the container 104 before the dependent computing resource 208a is allocated to the container 104. For example, the processing device 202 can receive a request to deploy the container 104. In response, the processing device 202 can determine multiple computing resources to allocate to the container 104 in order to deploy the container 104. The processing device 202 can then determine one or more relationships among the one or more computing resources, for example, by using the configuration data 108 of FIG. 1. At least one of the relationships can involve a dependent relationship between the dependent computing resource 208a and the other computing resource 208b.

In block 304, the processing device 202 determines a parameter value 212a for a backoff process 210a for checking the availability of the dependent computing resource 208a. The parameter value 212a can be determined using another parameter value 212b for another backoff process 210b for checking the availability of the other computing resource 208b. For example, the processing device 202 can determine the parameter value 212a by calculating the maximum, sum, or average of the other parameter value 212b and yet another parameter value (e.g., for yet another backoff process for yet another computing resource).

In block 306, the processing device 202 determines that the dependent computing resource 208a is available by executing the backoff process 210a using the parameter value 212a. For example, the processing device 202 can wait for an initial time-duration, and then check again to see if the dependent computing resource 208a is available. If not, the processing device 202 can repeatedly check to see if the dependent computing resource 208a is available. The processing device 202 repeatedly check at constant, increasing, or decreasing time intervals. In some examples, with each failed check, the processing device 202 can modify the time interval until the next check (e.g., can double the time interval, adjust the time interval based on the availability of the other computing resource 208b, etc.). This process can continue until the dependent computing resource 208a becomes available or a maximum time-duration is reached. In some examples, the parameter value 212a can include the initial time-duration, time interval between checks, the maximum time-duration, or any combination of these.

In block 308, the processing device 202 allocates the dependent computing resource 208a to the container 104 in response to determining that the dependent computing resource 208a is available. This may involve transmitting an electronic command to a remote computing device supplying the dependent computing resource 208a, for example, if the processing device 202 is in one server and the dependent computing resource 208a is at least partially supplied by another server.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. Some examples can be combined with other examples to yield further examples.

The invention claimed is:

1. A method comprising:
   determining, by a processing device, that a dependent computing resource is to be allocated to a container, wherein the dependent computing resource depends on another computing resource being allocated to the container before the dependent computing resource is allocated to the container;
   determining, by the processing device, a parameter value for a backoff process for checking the availability of the dependent computing resource, the parameter value being determined using another parameter value for another backoff process for checking the availability of the other computing resource;
   determining, by the processing device, that the dependent computing resource is available by executing the backoff process using the parameter value; and
   in response to determining that the dependent computing resource is available, allocating, by the processing device, the dependent computing resource to the container.

2. The method of claim 1, wherein the parameter value is at least one of (i) an initial-delay value indicating an initial time delay for which to wait before checking the availability of the dependent computing resource, (ii) a time-interval value indicating an amount of time to wait between a prior check and a next check of the availability of the dependent computing resource, or (iii) a maximum-duration value indicating a maximum time duration for which to check for the availability of the dependent computing resource.

3. The method of claim 1, wherein the other computing resource comprises a first computing resource and a second computing resource, and further comprising determining the parameter value for the backoff process using (i) a first parameter-value for a first backoff-process corresponding to the first computing resource, and (ii) a second parameter-value for a second backoff-process corresponding to the second computing resource.

4. The method of claim 3, wherein the parameter value for the backoff process is a sum of the first parameter-value and the second parameter-value.

5. The method of claim 3, wherein the parameter value for the backoff process is an average of the first parameter-value and the second parameter-value.

6. The method of claim 3, wherein the parameter value for the backoff process is the larger of the first parameter-value and the second parameter-value.

7. The method of claim 1, wherein the other computing resource comprises a first computing resource and a second computing resource, and wherein determining the parameter value for the backoff process comprises:
   determining a first-parameter value for the backoff process using (i) a first value of a first parameter in a first backoff-process for the first computing resource, and (ii) a second value of the first parameter in a second backoff-process for the second computing resource;
   determining a second-parameter value for the backoff process using (i) a first value of a second parameter in the first backoff-process, and (ii) a second value of the second parameter in the second backoff-process; and
   determining a third-parameter value for the backoff process using (i) a first value of a third parameter in the first backoff-process, and (ii) a second value of the third parameter in the second backoff-process.

8. The method of claim 1, further comprising, subsequent to checking for the availability of the dependent computing resource at least one time during the backoff process, updating the parameter value for the backoff process based on the availability of the other computing resource.

9. A system comprising:
   a processing device; and
   a memory device having instructions that are executable by the processing device for causing the processing device to:

determine that a dependent computing resource is to be allocated to a container, wherein the dependent computing resource depends on another computing resource being allocated to the container before the dependent computing resource is allocated to the container;

determine a parameter value for a backoff process for checking the availability of the dependent computing resource, the parameter value being determined using another parameter value for another backoff process for checking the availability of the other computing resource;

determine that the dependent computing resource is available by executing the backoff process using the parameter value; and in response to determining that the dependent computing resource is available, allocate the dependent computing resource to the container.

10. The system of claim 9, wherein the parameter value is at least one of (i) an initial-delay value indicating an initial time delay for which to wait before checking the availability of the dependent computing resource, (ii) a time-interval value indicating an amount of time to wait between a prior check and a next check of the availability of the dependent computing resource, or (iii) a maximum-duration value indicating a maximum time duration for which to check for the availability of the dependent computing resource.

11. The system of claim 9, wherein the other computing resource comprises a first computing resource and a second computing resource, and wherein the memory device further comprises instructions that are executable by the processing device for causing the processing device to determine the parameter value for the backoff process using (i) a first parameter-value for a first backoff-process corresponding to the first computing resource, and (ii) a second parameter-value for a second backoff-process corresponding to the second computing resource.

12. The system of claim 11, wherein the parameter value for the backoff process is a sum of the first parameter-value and the second parameter-value or the larger of the first parameter-value and the second parameter-value.

13. The system of claim 9, wherein the other computing resource comprises a first computing resource and a second computing resource, and wherein the memory device further comprises instructions that are executable by the processing device for causing the processing device to determine the parameter value for the backoff process by:

determining a first-parameter value for the backoff process using (i) a first value of a first parameter in a first backoff-process for the first computing resource, and (ii) a second value of the first parameter in a second backoff-process for the second computing resource;

determining a second-parameter value for the backoff process using (i) a first value of a second parameter in the first backoff-process, and (ii) a second value of the second parameter in the second backoff-process; and determining a third-parameter value for the backoff process using (i) a first value of a third parameter in the first backoff-process, and (ii) a second value of the third parameter in the second backoff-process.

14. The system of claim 9, wherein the memory device further comprises instructions that are executable by the processing device for causing the processing device to, subsequent to checking for the availability of the dependent computing resource at least one time during the backoff process, update the parameter value for the backoff process based on the availability of the other computing resource.

15. A non-transitory computer-readable medium comprising program code that is executable by a processing device for causing the processing device to:

determine that a dependent computing resource is to be allocated to a container, wherein the dependent computing resource depends on another computing resource being allocated to the container before the dependent computing resource is allocated to the container;

determine a parameter value for a backoff process for checking the availability of the dependent computing resource, the parameter value being determined using another parameter value for another backoff process for checking the availability of the other computing resource;

determine that the dependent computing resource is available by executing the backoff process using the parameter value; and in response to determining that the dependent computing resource is available, allocate the dependent computing resource to the container.

16. The non-transitory computer-readable medium of claim 15, wherein the parameter value is at least one of (i) an initial-delay value indicating an initial time delay for which to wait before checking the availability of the dependent computing resource, (ii) a time-interval value indicating an amount of time to wait between a prior check and a next check of the availability of the dependent computing resource, or (iii) a maximum-duration value indicating a maximum time duration for which to check for the availability of the dependent computing resource.

17. The non-transitory computer-readable medium of claim 15, wherein the other computing resource comprises a first computing resource and a second computing resource, and further comprising program code that is executable by the processing device for causing the processing device to determine the parameter value for the backoff process using (i) a first parameter-value for a first backoff-process corresponding to the first computing resource, and (ii) a second parameter-value for a second backoff-process corresponding to the second computing resource.

18. The non-transitory computer-readable medium of claim 17, wherein the parameter value for the backoff process is a sum of the first parameter-value and the second parameter-value or the larger of the first parameter-value and the second parameter-value.

19. The non-transitory computer-readable medium of claim 15, wherein the other computing resource comprises a first computing resource and a second computing resource, and further comprising program code that is executable by the processing device for causing the processing device to determine the parameter value for the backoff process by:

determining a first-parameter value for the backoff process using (i) a first value of a first parameter in a first backoff-process for the first computing resource, and (ii) a second value of the first parameter in a second backoff-process for the second computing resource;

determining a second-parameter value for the backoff process using (i) a first value of a second parameter in the first backoff-process, and (ii) a second value of the second parameter in the second backoff-process; and determining a third-parameter value for the backoff process using (i) a first value of a third parameter in the first backoff-process, and (ii) a second value of the third parameter in the second backoff-process.

20. The non-transitory computer-readable medium of claim 15, further comprising program code that is executable by the processing device for causing the processing device to, subsequent to checking for the availability of the dependent computing resource at least one time during the backoff process, update the parameter value for the backoff process based on the availability of the other computing resource.

* * * * *